United States Patent
Muto et al.

(10) Patent No.: US 11,961,311 B2
(45) Date of Patent: Apr. 16, 2024

(54) ON-VEHICLE SYSTEM, EXTERNALITY RECOGNITION SENSOR, ELECTRONIC CONTROL DEVICE

(71) Applicant: Hitachi Astemo, Ltd., Hitachinaka (JP)

(72) Inventors: Yuta Muto, Tokyo (JP); Akira Kuriyama, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 339 days.

(21) Appl. No.: 17/609,487

(22) PCT Filed: Apr. 28, 2020

(86) PCT No.: PCT/JP2020/018199
§ 371 (c)(1),
(2) Date: Nov. 8, 2021

(87) PCT Pub. No.: WO2020/230637
PCT Pub. Date: Nov. 19, 2020

(65) Prior Publication Data
US 2022/0230452 A1    Jul. 21, 2022

(30) Foreign Application Priority Data
May 13, 2019  (JP) .................. 2019-090541

(51) Int. Cl.
*G06V 20/56*  (2022.01)
*B60W 40/06*  (2012.01)
(Continued)

(52) U.S. Cl.
CPC .......... *G06V 20/588* (2022.01); *B60W 40/06* (2013.01); *B60W 50/0205* (2013.01);
(Continued)

(58) Field of Classification Search
CPC ...... G06V 20/588; G06V 10/20; G06V 10/46; G06V 10/98; G06V 10/96; B60W 40/06;
(Continued)

(56) References Cited

U.S. PATENT DOCUMENTS 10,037,689 B2 *  7/2018  Taylor ................ G05D 1/0285
10,571,289 B2 *  2/2020  Matsuzawa ............ G06F 16/29
(Continued)

FOREIGN PATENT DOCUMENTS

CN  105760812 A  *  7/2016  ......... G06K 9/00798
CN  108550279 A  *  9/2018  ............ B60W 40/08
(Continued)

OTHER PUBLICATIONS

International Search Report, PCT/JP2020/018199, dated Jul. 14, 2020, 2 pgs.

*Primary Examiner* — Mahendra R Patel
(74) *Attorney, Agent, or Firm* — Volpe Koenig

(57) ABSTRACT

This on-vehicle system is to be mounted in a vehicle and is provided with an electronic control device and an externality recognition sensor. The externality recognition sensor is equipped with a sensing unit for acquiring pre-processing externality information through sensing operations. The on-vehicle system is further equipped with: a condition calculation unit that, on the basis of a vehicle position, a vehicle traveling direction, and map information, calculates a processing condition in which information specifying an area on a map is associated with processing priority of the
(Continued)

pre-processing externality information acquired by the externality recognition sensor; and a processing object determination unit that, on the basis of the pre-processing externality information and the processing condition, creates externality information having a smaller amount of information compared with the pre-processing externality information.

10 Claims, 14 Drawing Sheets

(51) Int. Cl.
*B60W 50/02* (2012.01)
*G06V 10/20* (2022.01)
*G06V 10/46* (2022.01)
*G06V 10/98* (2022.01)

(52) U.S. Cl.
CPC .............. *G06V 10/20* (2022.01); *G06V 10/46* (2022.01); *G06V 10/98* (2022.01); *B60W 2420/42* (2013.01); *B60W 2420/52* (2013.01); *B60W 2420/62* (2013.01); *B60W 2520/06* (2013.01); *B60W 2552/53* (2020.02); *B60W 2554/4026* (2020.02); *B60W 2554/4029* (2020.02)

(58) Field of Classification Search
CPC ......... B60W 50/0205; B60W 2420/42; B60W 2420/52; B60W 2420/62; B60W 2520/06; B60W 2552/53; B60W 2554/4026; B60W 2554/4029; B60W 2050/065; B60W 2540/18; B60W 40/04; G08G 1/16
USPC ........................................................ 382/104
See application file for complete search history.

(56) References Cited

U.S. PATENT DOCUMENTS

| | | | |
|---|---|---|---|
| 11,567,514 B2 * | 1/2023 | Musk ................. | B62D 15/0285 |
| 2009/0005980 A1 * | 1/2009 | Nakao .................... | G01C 21/28 |
| | | | 701/414 |
| 2009/0169055 A1 * | 7/2009 | Ishikawa ............ | G01C 21/3815 |
| | | | 382/104 |
| 2012/0269382 A1 * | 10/2012 | Kiyohara ............. | G06V 20/588 |
| | | | 382/103 |
| 2016/0012282 A1 * | 1/2016 | Shima .................... | G06V 20/56 |
| | | | 382/103 |
| 2017/0243485 A1 * | 8/2017 | Rubin ..................... | H04W 4/46 |
| 2018/0181118 A1 | 6/2018 | Yoneda et al. | |
| 2018/0240249 A1 * | 8/2018 | Uchigaito ............. | G06V 40/10 |
| 2019/0001986 A1 * | 1/2019 | Horita .................. | B60W 40/04 |
| 2020/0298877 A1 * | 9/2020 | Takamatsu ......... | G01C 21/3492 |

FOREIGN PATENT DOCUMENTS

| | | | | |
|---|---|---|---|---|
| EP | 2009398 A2 * | 12/2006 | ............. | G01C 21/28 |
| EP | 3734389 A1 * | 11/2020 | ............. | G01C 21/20 |
| JP | 2004217175 A * | 8/2004 | ......... | B60K 31/0008 |
| JP | 3896852 B2 * | 3/2007 | ......... | B60R 21/0132 |
| JP | 2008305014 A * | 12/2008 | ............. | G08G 1/161 |
| JP | 2011-044063 A | 3/2011 | | |
| JP | 2017009553 A * | 1/2017 | | |
| JP | 2018-091315 A | 6/2018 | | |
| JP | 2018-106676 A | 7/2018 | | |
| JP | 6678776 B2 * | 4/2020 | ............. | B60W 50/10 |
| JP | 2020142770 A * | 9/2020 | ............. | B60W 30/09 |
| WO | WO-2013179852 A1 * | 12/2013 | ............. | G01C 21/10 |
| WO | WO-2014024773 A1 * | 2/2014 | ............. | G01C 21/34 |
| WO | 2014/132747 A1 | 9/2014 | | |
| WO | WO-2014132747 A1 * | 9/2014 | ............... | B60R 1/00 |
| WO | WO-2017077621 A1 * | 5/2017 | ........... | G05D 1/0011 |
| WO | WO-2018168956 A1 * | 9/2018 | ....... | B60W 30/18163 |
| WO | WO-2019026832 A1 * | 2/2019 | ............. | G01S 17/89 |
| WO | WO-2020012209 A1 * | 1/2020 | ............ | B21D 19/088 |

* cited by examiner

| CONDITION CREATION SOURCE | | | |
|---|---|---|---|
| 3211 | 3212 | 3213 | 3214 |
| CONDITION | RANGE DERIVATION EQUATION | PRIORITY | PROCESSING GRANULARITY |
| IN ROUTE & INTERSECTION | f1(La,Lo,θ) | 1 | 1/1m |
| IN ROUTE & LINEAR | f2(La,Lo,θ) | 2 | 1/4m |
| : | : | : | : |

| PROCESSING CONDITION | | | | | | |
|---|---|---|---|---|---|---|
| 3221 | 3222 | 3223 | | | | 3224 |
| PRIORITY | PROCESSING GRANULARITY | AREA | | | | NODE |
| | | Xmin | Xmax | Ymin | Xmax | |
| 1 | 1 POINT/1M | Xl1 | Xu1 | Yl1 | Yu1 | A |
| 2 | 1 POINT/4M | Xl2 | Xu2 | Yl2 | Yu2 | B |
| : | : | : | : | : | : | : |

FIG. 8

| EXTERNALITY INFORMATION 122(325) | | |
|---|---|---|
| X COORDINATE 1221 | Y COORDINATE 1222 | PROBABILITY 1223 |
| X1 | Y1 | 100 |
| X2 | Y2 | 90 |
| X3 | Y3 | 50 |
| : | : | : |

ON-VEHICLE SYSTEM, EXTERNALITY RECOGNITION SENSOR, ELECTRONIC CONTROL DEVICE

TECHNICAL FIELD

The present invention relates to an on-vehicle system, an externality recognition sensor, and an electronic control device.

BACKGROUND ART

The arithmetic device mounted in a vehicle is required to detect various objects present around the vehicle and deal with them. However, because of cost reduction, the arithmetic device does not always incorporate a computing unit with a high processing capacity. Patent Literature 1 discloses an object sensing device that includes image capture units for capturing images of the external world outside a host vehicle, and a processing device for sensing the objects to be sensed from the images captured by the image capture units. The processing device includes: a scene analysis unit for analyzing a travel scene of the host vehicle; a processing priority change unit for changing the sensing process priority of the object to be sensed, on the basis of the travel scene analyzed by the scene analysis unit; and a sensing object sensing unit for sensing the object to be sensed, on the basis of the sensing process priority changed by the processing priority change unit.

CITATION LIST

Patent Literature

Patent Literature 1: WO 2014/132747

SUMMARY OF INVENTION

Technical Problem

The invention described in Patent Literature 1 has room for improvement in terms of dealing with an environment in which there is a lot of information on the external world (externality information).

Solution to Problem

An on-vehicle system according to a first aspect of the present invention is an on-vehicle system that is mounted in a vehicle and provided with an electronic control device and an externality recognition sensor. The externality recognition sensor comprises a sensing unit that acquires pre-processing externality information through sensing operation. The system comprises: a condition calculation unit that, on the basis of the position of the vehicle, traveling direction of the vehicle, and map information, calculates a processing condition in which information identifying an area on the map is associated with processing priority of the pre-processing externality information acquired by the externality recognition sensor; and a processing object determination unit that, on the basis of the pre-processing externality information and the processing condition, creates externality information having a smaller amount of information than the pre-processing externality information.

An externality recognition sensor according to a second aspect of the present invention is an externality recognition sensor that is mounted in a vehicle. The sensor comprises: a sensing unit that acquires pre-processing externality information through sensing operation; a reception unit that acquires a processing condition created on the basis of the position of the vehicle, traveling direction of the vehicle, and map information in which information identifying an area on the map is associated with processing priority of the pre-processing externality information acquired by the externality recognition sensor; and a processing object determination unit that, on the basis of the pre-processing externality information and the processing condition, creates externality information having a smaller amount of information than the pre-processing externality information.

An electronic control device according to a third aspect of the present invention is an electronic control device that is mounted in a vehicle and connected to an externality recognition sensor that acquires pre-processing externality information through sensing operation, in which the electronic control device comprises: a condition calculation unit that, on the basis of the position of the vehicle, traveling direction of the vehicle, and map information, calculates a processing condition in which information identifying an area on the map is associated with processing priority of the pre-processing externality information acquired by the externality recognition sensor; a pre-processing externality information acquisition unit that acquires the pre-processing externality information from the externality recognition sensor; and a processing object determination unit that, on the basis of the pre-processing externality information and the processing condition, creates externality information having a smaller amount of information than the pre-processing externality information.

Advantageous Effects of Invention

According to the present invention, it is possible to deal with an environment in which there is a lot of externality information. Other issues, elements and effects will become apparent from the description of embodiments given below.

BRIEF DESCRIPTION OF DRAWINGS

FIG. 3 is a diagram which shows an example of the condition creation source.

FIG. 4 is a diagram which shows an example of the processing condition.

FIG. 8 is a diagram which shows an example of externality information.

DESCRIPTION OF EMBODIMENTS

First Embodiment

Figure 1:
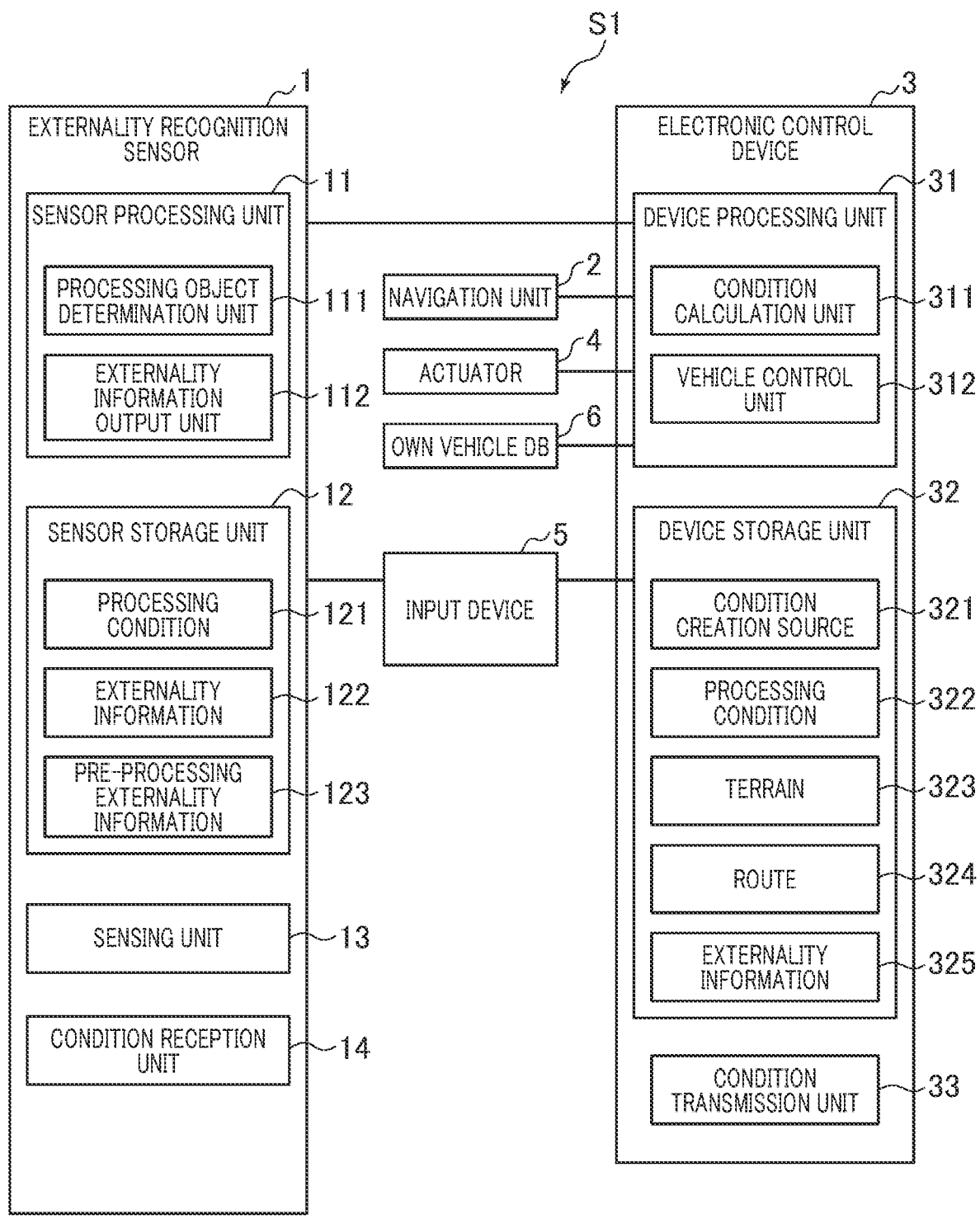
FIG. 1 is a general configuration diagram of an on-vehicle system according to the first embodiment of the present invention.

FIG. 1 is a general configuration diagram of an on-vehicle system S1 according to the present invention. The on-vehicle system S1 is mounted in a vehicle and provided with an externality recognition sensor 1, a navigation unit 2, an electronic control device 3, an actuator 4, an input device 5, and an own vehicle DB 6. These are connected by signal lines as shown in FIG. 1. Hereinafter, the vehicle in which the on-vehicle system S1 is mounted is called as the "own vehicle" in order to distinguish it from other vehicles.

The externality recognition sensor 1 detects the position of a landmark present around the own vehicle or the like as externality information. The externality recognition sensor 1 is, for example, a camera or laser radar or the like. Although FIG. 1 shows that the on-vehicle system S1 includes only one externality recognition sensor 1, the on-vehicle system S1 may include a plurality of externality recognition sensors 1. The navigation unit 2 outputs information such as route, terrain, and the latitude and longitude of the own vehicle. The electronic control device 3 derives the position of the landmark and determines the method for controlling the own vehicle.

The actuator 4 is a steering wheel, brake, and accelerator which change the orientation and speed of the vehicle. Although FIG. 1 shows that the on-vehicle system S1 includes only one actuator 4, the on-vehicle system S1 may include a plurality of actuators 4. The input device 5 reads, writes, and rewrites information which is stored in a sensor storage unit 12 of the externality recognition sensor 1 and information which is stored in a device storage unit 32 of the electronic control device 3. The input device is, for example, a personal computer. The on-vehicle system S1 may include a plurality of input devices 5. The own vehicle DB 6 is a database which outputs the speed, yaw rate, and winker input condition of the own vehicle, and the steering angle of the steering wheel. The own vehicle DB 6 successively receives information on the speed, yaw rate and winker or steering wheel operation status of the own vehicle from a sensor (not shown) mounted in the own vehicle.

The externality recognition sensor 1 includes a sensor processing unit 11, a sensor storage unit 12, a sensing unit 13, and a condition reception unit 14. The hardware configuration of the sensor processing unit 11 will be described later. The sensor storage unit 12 is a nonvolatile memory area and for example, a flash memory or EEPROM (Electrically Erasable Programmable Read-Only Memory). The sensor processing unit 11 includes a processing object determination unit 111 and an externality information output unit 112. The sensor storage unit 12 stores a processing condition 121, externality information 122, and pre-processing externality information 123.

The sensing unit 13 is a combination of sensor components, for example, a light source and a light receiving element. The sensing unit 13 performs sensing in a given processing cycle and stores the pre-processing externality information 123 in the sensor storage unit 12. The condition reception unit 14 receives a processing condition 322 from the electronic control device 3 and stores it as the processing condition 121 in the sensor storage unit 12. The condition reception unit 14 is, for example, a communication module which conforms to CAN (registered trademark) or IEEE802.3.

The electronic control device 3 includes a device processing unit 31, a device storage unit 32, and a condition transmission unit 33. The hardware configuration of the device processing unit 31 will be described later. The device storage unit 32 is a nonvolatile memory area and for example, a flash memory or EEPROM. The device processing unit 31 includes a condition calculation unit 311 and a vehicle control unit 312. The device processing unit 31 stores the information received from the externality recognition sensor 1, navigation unit 2 and own vehicle DB6 in the device storage unit 32. The device storage unit 32 stores a condition creation source 321, processing condition 322, terrain 323, route 324, and externality information 325. The condition transmission unit 33 is, for example, a communication module which conforms to CAN or IEEE802.3.

As will be described in detail, the processing condition 121 stored in the sensor storage unit 12 and the processing condition 322 stored in the device storage unit 32 are the same. Also, the externality information 122 stored in the sensor storage unit 12 and the externality information 325 stored in the device storage unit 32 are the same. Specifically, the processing condition 322 is created by the condition calculation unit 311 and the processing condition 322 is transmitted from the electronic control device 3 to the externality recognition sensor 1 by the condition transmission unit 33 and stored in the sensor storage unit 12 as the processing condition 121. Also, the externality information 122 is created by the externality information output unit 112 and the externality information 122 is transmitted from the externality recognition sensor 1 to the electronic control device 3 and stored in the device storage unit 32 as the external information 325. This embodiment assumes that the processing condition 121 and processing condition 322 are the same in all aspects including the data storage method and the externality information 122 and externality information 325 are the same in all aspects including the data storage method, but instead they may be different in terms of the data storage method or data expression.

The configuration shown in FIG. 1 merely shows a logical configuration and there is no limitation to the physical configuration. For example, an alternative physical configuration may be that the sensor processing unit 11 and sensor storage unit 12 are mounted in a device in which the electronic control device 3 is mounted.

Figure 2:
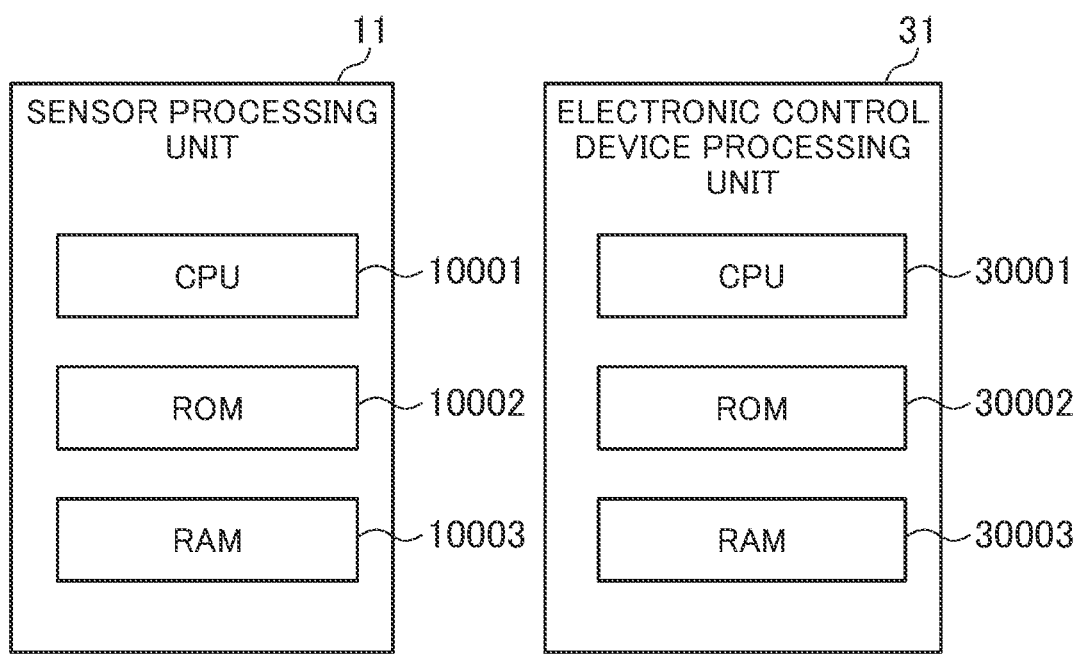
FIG. 2 is a hardware configuration diagram of the sensor processing unit and device processing unit.

FIG. 2 is a diagram which shows the hardware configurations of the sensor processing unit 11 and device processing unit 31. The sensor processing unit 11 includes a CPU 10001 as a central processing unit, a ROM 10002 as a read-only memory, and a RAM 10003 as a readable and writable memory. The CPU 10002 expands the program stored in the ROM 10002 into the RAM 10003 and executes it to realize a processing object determination unit 111 and an externality information output unit 112.

However, instead of the combination of the CPU 10001, ROM 10002, and RAM 10003, the sensor processing unit 11 may be realized by an FPGA (Field Programmable Gate Array) as a rewritable logic circuit or an ASIC (Application Specific Integrated Circuit). Also, instead of the combination of the CPU 10001, ROM 10002, and RAM 10003, the sensor processing unit 11 may be realized by a different combination, for example, a combination of the CPU 10001, ROM 10002, RAM 10003, and an FPGA.

The device processing unit 31 includes a CPU 30001 as a central processing unit, a ROM 30002 as a read-only memory, and a RAM 30003 as a readable and writable memory. The CPU 30002 expands the program stored in the ROM 30002 into the RAM 30003 and executes it to realize a condition calculation unit 311 and a vehicle control unit 312. However, instead of the combination of the CPU 30001, ROM 30002, and RAM 30003, the device processing unit 31 may be realized by an FPGA or ASIC. Also, instead of the combination of the CPU 30001, ROM 30002, and RAM 30003, the device processing unit 31 may be realized by a different combination, for example, a combination of the CPU 30001, ROM 30002, RAM 30003, and an FPGA.

(Outline of Data)

Next, the data which is stored in the sensor storage unit 12 and device storage unit 32 will be outlined. The condition creation source 321 has previously been stored in the device storage unit 32 and the condition creation source 321 is not changed in the scope in which this embodiment is described. In this embodiment, the navigation unit 2 has created the route 324 in advance through user operation. The route 324 is information which indicates the travel route along which the own vehicle travels. The terrain 324 is information on nodes in an area including the route 324. The processing condition 322 is created by the condition calculation unit 311 in reference to the position of the own vehicle, the condition creation source 321, terrain 323, and route 324. Since the processing condition 322 is also influenced by the position of the own vehicle, the processing condition 322 is created with high frequency, for example, every 200 ms.

As mentioned above, the processing condition 322 and processing condition 121 are the same. The pre-processing externality information 123 is information on the area around the own vehicle which is collected by the externality recognition sensor 1, and updated with high frequency, for example, every 200 ms. The externality information 122 is created by the externality information output unit 112 on the basis of the processing condition 121 and pre-processing externality information 123. The externality information output unit 112 is transmitted to the electronic control device 3 and stored as the externality information 325 in the device storage unit 32. The electronic control device 3 enters the externality information 325 into the vehicle control unit 312. However, instead, the electronic control device 3 may not use the externality information 325 and may send the externality information 325 to another device connected to the electronic control device 3.

(Condition Creation Source)

FIG. 3 is a diagram which shows an example of the condition creation source 321. The condition creation source 321 has a plurality of records and each record has fields for condition 3211, range derivation equation 3212, priority 3212, and processing granularity 3214. The condition to which what is written in the record is applied is stored in the field for condition 3211. For example, "IN ROUTE & INTERSECTION" written in the first record in FIG. 3 indicates a condition that the node is included in the route 324 and terrain 323 and the attribute of the node in the terrain 323 is "INTERSECTION".

The derivation equation for deriving the range to which the priority and processing granularity written in the same record is applied is stored in the field for range derivation equation 3212. The functions f1 and f2 shown in FIG. 3 are range derivation equations which are separately defined and indicate the use of longitude, latitude, and rotation angle. A concrete example of a range derivation equation will be described later. "A derivation equation" is a concept and need not always be expressed by a numerical formula and for example, the process of derivation may be expressed, using a flowchart.

The order of priority in the process for the externality recognition sensor 1 to derive the landmark position is stored in the field for priority 3213. In this embodiment, when the value in the field for priority is smaller, higher priority is given. The interval between landmark positions in landmark position output by the externality recognition sensor 1 is stored in the field for processing granularity 3214. For example, processing granularity "1 point/1 m" denotes that a landmark position is output on the basis of one point per 1 m and "1 point/4 m" denotes that a landmark position is output on the basis of one point per 4 m.

(Processing Condition)

FIG. 4 is a diagram which shows an example of the processing condition 121 and processing condition 322. Although the composition of the processing condition 322 is explained below, the composition of the processing condition 121 is the same. The processing condition 322 has a plurality of records and each record has fields for priority 3221, processing granularity 3222, area 3223, and node 3224. The fields for priority 3221 and processing granularity 3222 correspond to the fields for priority 3213 and processing granularity 3214 in the condition creation source 321 shown in FIG. 3. The field for area 3223 stores information on the object area to which the priority and processing granularity in the record are applied.

In the example shown in FIG. 4, the object area is a rectangle parallel to an axis set in the coordinate system with reference to the own vehicle and the minimum and maximum values of X coordinate and the minimum and maximum values of Y coordinate are stored in the area 3223. However, the shape of the object area is not limited to a rectangle but instead it may be a parallelogram, trapezoid, rhomboid, or ellipse. Even when the object area is a rectangle, the information on the coordinates of the four corners of the rectangle may be stored in the field for area 3223. The identifier of the node nearest to the area indicated in the field for area 3223 is stored in the field for node 3224. However, the processing condition 121 and processing condition 322 may not have the field for node 3224.

(Example of Intersection)

Figure 5:
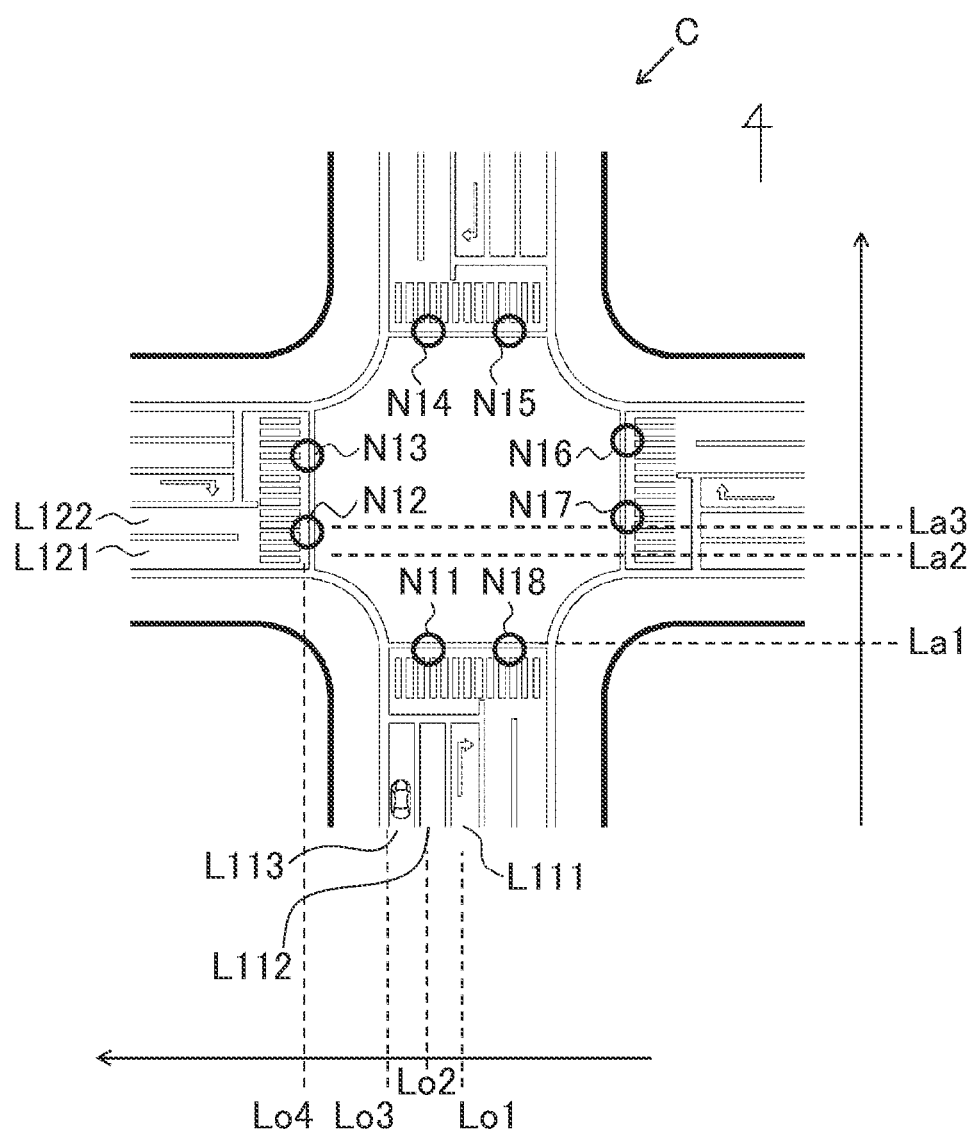
FIG. 5 is a diagram which shows an example of the intersection.

FIG. 5 is a diagram which shows an example of intersection C. Since terrain 323 and route 324 are explained using the example of intersection C shown in FIG. 5, intersection C is first explained. The intersection C shown in FIG. 5 is an intersection where a road running south and north and a road running east and west intersect, in which the upward direction in the figure is north. In the example shown in FIG. 5, different nodes are set in each traveling direction on the roads. Specifically, node N11 to node N 18 are set. For example, while node N11 and node N18 are both ends of the road shown on the lower side of the figure, they are set as different nodes because node N11 is a node on the side for entering the intersection and node N18 is a node on the side for leaving the intersection. Here, the ends of the road mean the ends nearest to the intersection.

Node N11 covers lane L111, lane L112, and lane L113. Node N12 covers lane L121 and lane L122. The latitude of the end of lane L111 is "La1" and the longitude of the end of lane L111 is "Lo1". Since lane L111, lane L112, and lane L113 are arranged side by side horizontally, the latitude of the ends of lane L112 and lane L113 is also "La1". The longitude of the end of lane L112 is "Lo2" and the longitude of the end of lane L113 is "Lo3". The longitudes of lane L121 and lane L122 covered by node N12 are both "Lo4". The latitude of lane L121 is "La2" and the latitude of lane L122 is "La3".

(Terrain)

Figure 6:
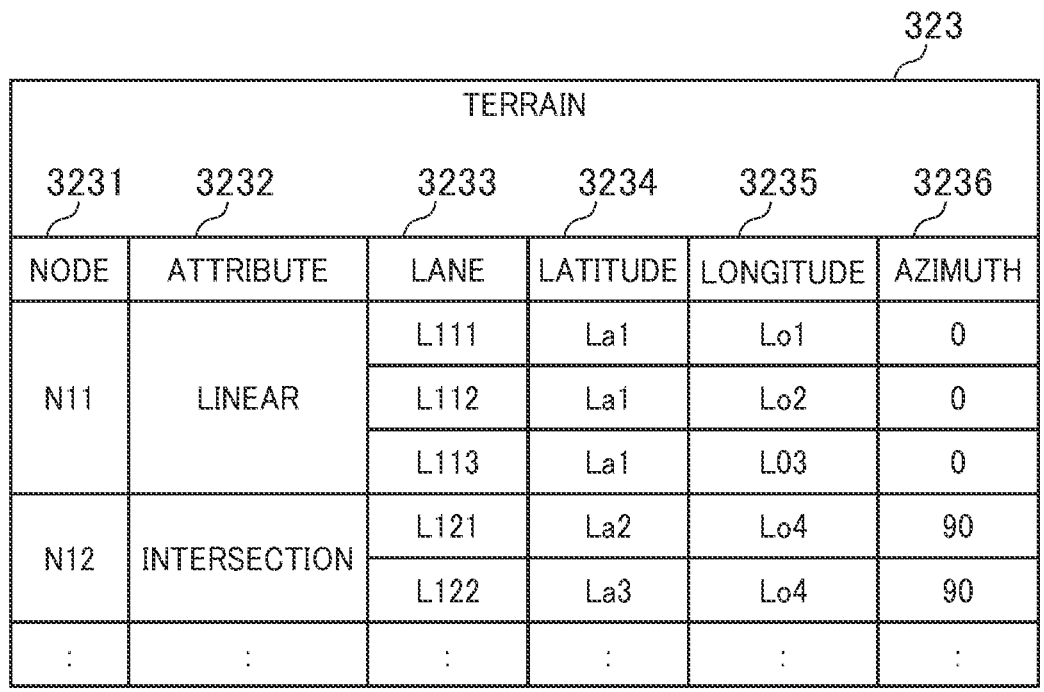
FIG. 6 is a diagram which shows an example of the terrain.

FIG. 6 is a diagram which shows an example of terrain 323. Terrain 323 is comprised of a plurality of records and each record has fields for node 3231, attribute 3232, lane 3233, latitude 3234, longitude 3235, and azimuth 3236.

The sign which denotes a representative point on the terrain is stored in the field for node 3231. Representative points are set for each road connected to the intersection so that the traveling route of the own vehicle can be specified by specifying nodes in a sequential order. In addition, nodes are set for each vehicle traveling direction. For example, the intersection C shown in FIG. 5 where four roads intersect has eight nodes (4×2).

The field for attribute 3232 indicates the attribute of the last road leading to the node in the record. For example, if the road just before the node in the record is linear, "linear" is stored in the attribute 3232 and if there is an intersection just before the node in the record, "intersection" is stored in the attribute. For example, in the intersection C shown in FIG. 5, for node N11, which is located in a position to enter the intersection C from the lower side in the figure, "linear" is stored in the attribute 3232. For node 12, which is located in a position to move leftward from the intersection C in the figure, "intersection" is stored in the attribute 3232.

The information to identify the lanes covered by the node in the record is stored in the lane 3233. For example, since node N11 in the intersection C shown in FIG. 5 covers three lanes, these lanes are written in the terrain 323 shown in FIG. 6. The latitudes of the ends of the lanes in the record are stored in the latitude 3234. The longitudes of the ends of the lanes in the record are stored in the longitude 3235. The direction of the lanes in the record is stored in the azimuth 3236. The azimuth of a lane, for example, means the angle of the line obtained by linear approximation of the lane, with respect to true north.

(Route)

Figure 7:
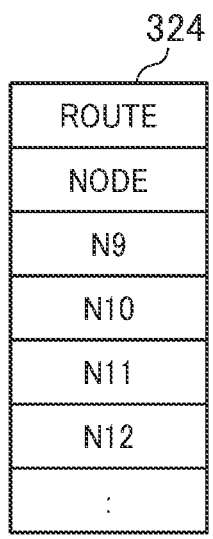
FIG. 7 is a diagram which shows an example of the route.

FIG. 7 is a diagram which shows an example of route 324. Route 324 indicates the order in which the vehicle passes the nodes on the route along which the vehicle runs. For route 324, the identifier of the node 3231 in the terrain 323 is used. In the example shown in FIG. 7, the nodes are listed in the order in which the vehicle runs, from top to bottom.

(Externality Information)

FIG. 8 is a diagram which shows an example of externality information 122 and externality information 325. Although the composition of externality information 122 is explained below, the composition of externality information 325 is the same. Externality information 122 is comprised of a plurality of records and each record has fields for X coordinate 1221, Y coordinate 1222, and probability 1223. The landmark position information with reference to the own vehicle is stored in the X coordinate 1221 and Y coordinate 1222. Specifically, with the center of the own vehicle as the origin, the direction ahead of the own vehicle which passes through the center of the own vehicle is taken as the positive direction of X axis.

Furthermore, Y axis, which is perpendicular to the X axis, is defined and for example, the left of the own vehicle is taken as the positive direction of the Y axis. The index which indicates the correctness of the landmark position in the record is stored in the field for probability 1223. In the example shown in FIG. 8, when the value stored in the probability 1223 is larger, correctness is higher. For example, when the externality recognition sensor 1 is a laser radar, the index stored in the probability 1223 is determined on the basis of the magnitude of reflection intensity difference between the road surface around the landmark position and the landmark position.

(Range Derivation Equation)

Next, the information which is stored in the range derivation equation 3212 in FIG. 3 will be explained. As for the range derivation equation, there are a plurality of variations other than f1 and f2 shown in FIG. 3 and each of them uses the terrain 323, route 324, and the position of the own vehicle. Next, two examples of range derivation equation will be explained referring to FIG. 9 to FIG. 12.

Figure 9:
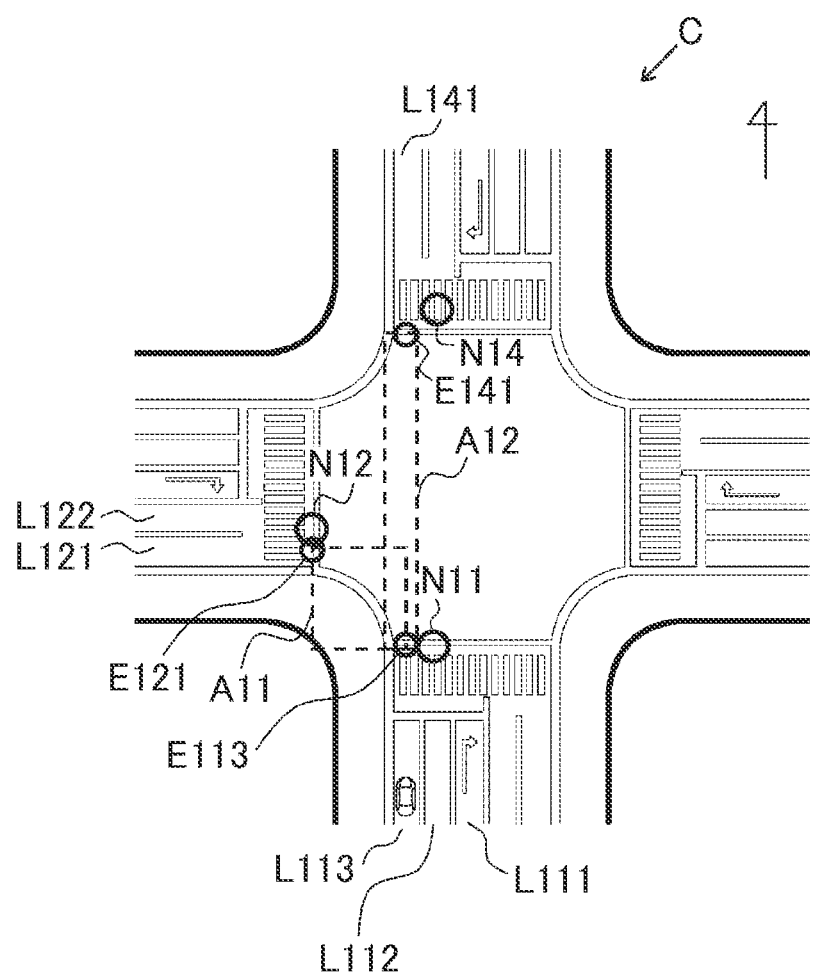
FIG. 9 is a diagram which shows an example of the range calculated by range derivation equation f1.
Figure 10:
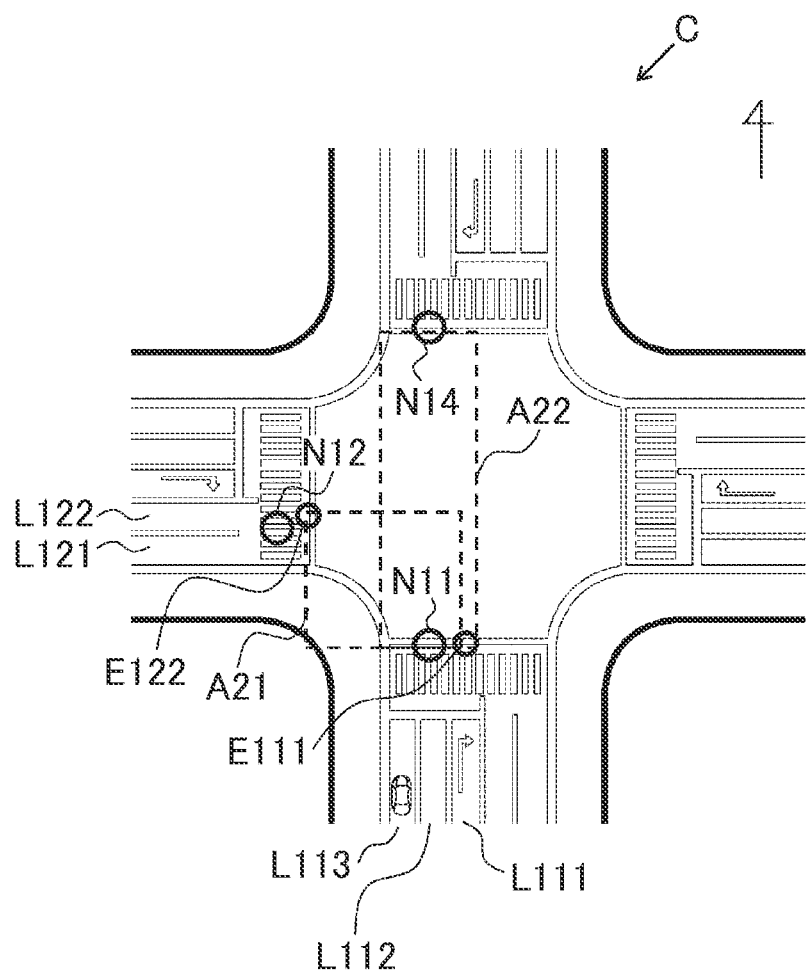
FIG. 10 is a diagram which shows an example of the range calculated by range derivation equation f2.
Figure 11:
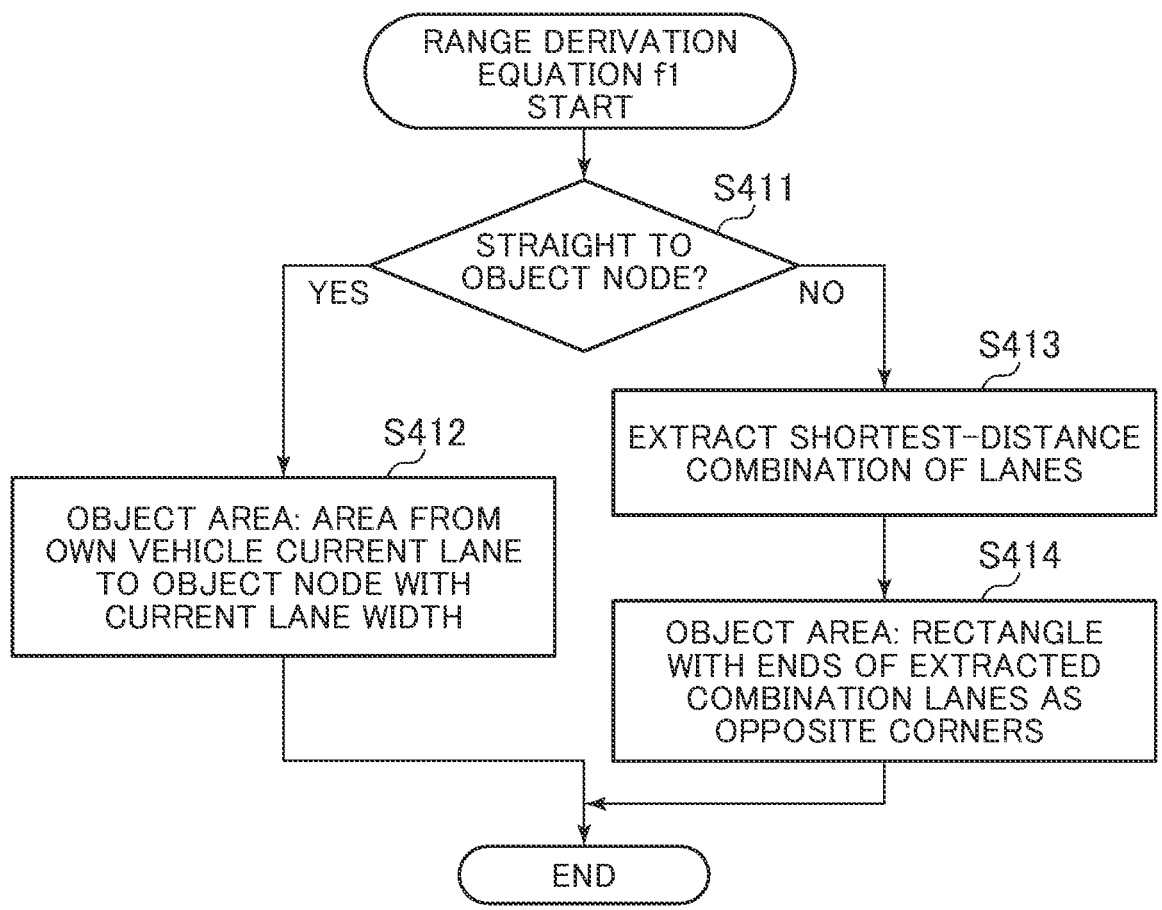
FIG. 11 is a flowchart which shows the calculation process of range derivation equation f1.
Figure 12:
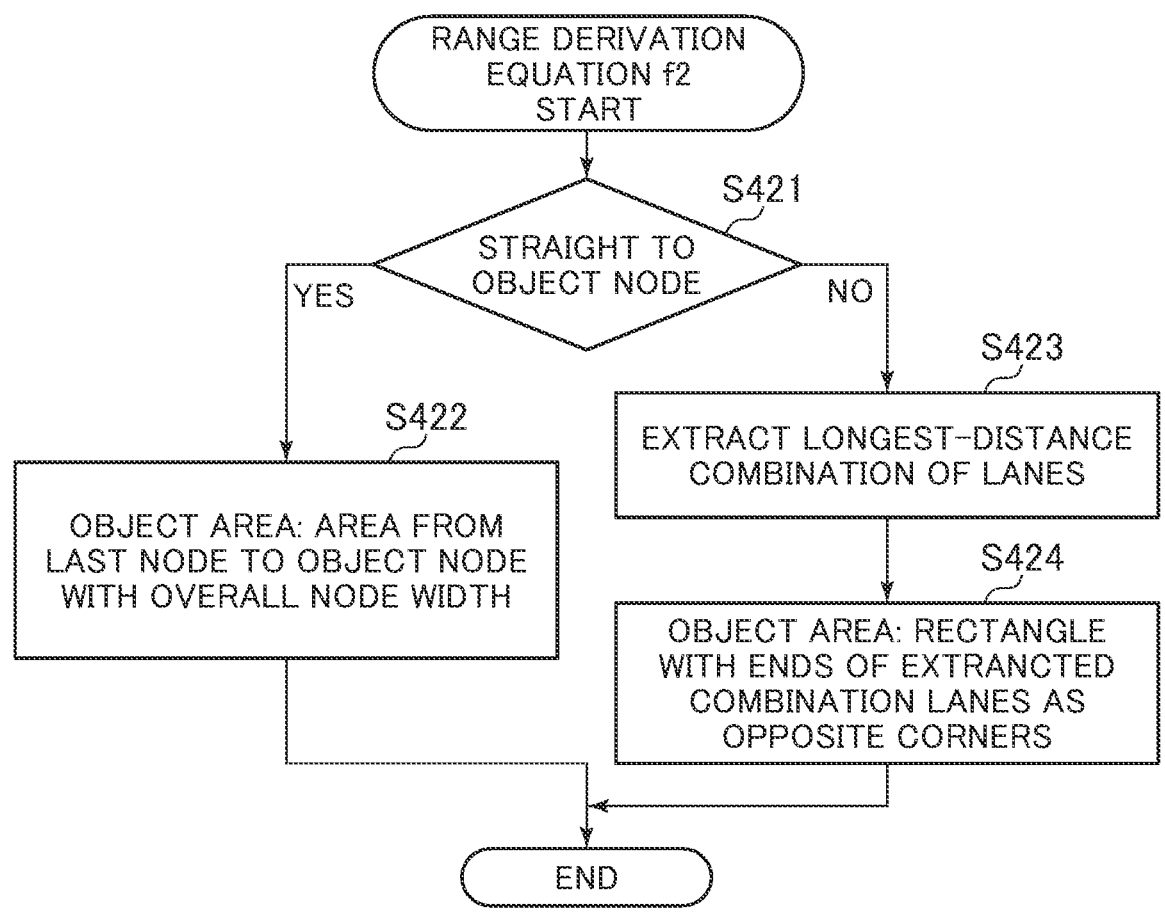
FIG. 12 is a flowchart which shows the calculation process of range derivation equation f2.

FIG. 9 is a diagram which shows an example of the range calculated by range derivation equation f1 and FIG. 10 is a diagram which shows an example of the range calculated by range derivation equation f2. FIG. 11 is a flowchart which shows the calculation process of range derivation equation f1 and FIG. 12 is a flowchart which shows the calculation process of range derivation equation f2. FIG. 9 and FIG. 10 show the intersection C shown above, and the terrain 323 is the one shown in FIG. 6.

As shown in FIG. 9, with the range derivation equation f1, when the vehicle travels from node N11 to node N12, an area A11 is calculated and when the vehicle travels from node N11 to node N14, an area A12 is calculated. As shown in FIG. 10, with the range derivation equation f2, when the vehicle travels from node N11 to node N12, an area A21 is calculated and when the vehicle travels from node N11 to node N14, an area A22 is calculated. The range derivation equation f1 and range derivation equation f22 calculate different areas even when the condition is the same. For example, the calculation of an area is performed as follows.

The process of calculation by the range derivation equation f1 as shown in FIG. 11 is explained below. Here, the node to which the own vehicle moves next is called "object node". First, at Step S411 the condition calculation unit 311 decides whether the route from the current position of the vehicle to the object node is straight or not. If it decides that the route is straight, it goes to Step S412 and if it decides that the route is not straight, it goes to Step S413. At Step S412, the condition calculation unit 311 calculates an object area as an area from the current lane on which the own vehicle runs, to the object node, in which the area has the same width as the lane, for example, the area A12 in FIG. 9.

At Step S413, the condition calculation unit 311 extracts a combination of lanes with the shortest distance. In the example shown in FIG. 9, among combinations of two lanes, each combination having one of the three lanes L111, L112, and L113 covered by node N11 and one of the two lanes L121 and L122 covered by node N12, the combination of lanes with the shortest distance is extracted. In this example, there are a total of six combinations and among them, the combination of lane L113 and lane L121 in which the distance is the shortest is extracted.

At the next step S414, the condition calculation unit 311 determines, as an object area, a rectangular area in which the ends of the lanes of the combination extracted at Step S413 are opposite corners. In the example shown in FIG. 9, the rectangular area A11 in which end E113 of lane L113 and end E121 of lane L121 are opposite corners is an object area. When Step S412 or Step S414 is completed, the process shown in FIG. 11 is ended.

The process of calculation by the range derivation equation f2 as shown in FIG. 12 is explained below. However, explanations of the same steps as in the process of calculation by the range derivation equation f1 are omitted. Since Step S421 is the same as Step S411, its explanation is omitted. If a positive decision is made at Step S421, the condition calculation unit 311 goes to Step S422 or if a negative decision is made at Step S421, it goes to Step S423. At Step S422, "the width of the lane on which the own vehicle is running" at Step S412 is replaced by "the overall width of the node with which the own vehicle is running". Therefore, the area A22 shown in FIG. 10 is an object area.

At Step S423, conversely to Step S413, a combination of lanes in which the distance is the longest is extracted. In the example shown in FIG. 10, lane L111 and lane L122 are extracted. The next step S424 is the same as Step S414. However, since the combination of lanes extracted at the preceding step is different, in the example shown in FIG. 10, the rectangular area A21 in which end E11' of lane L111 and end E122 of lane L122 are opposite corners is an object area.

(Flowchart)

Figure 13:
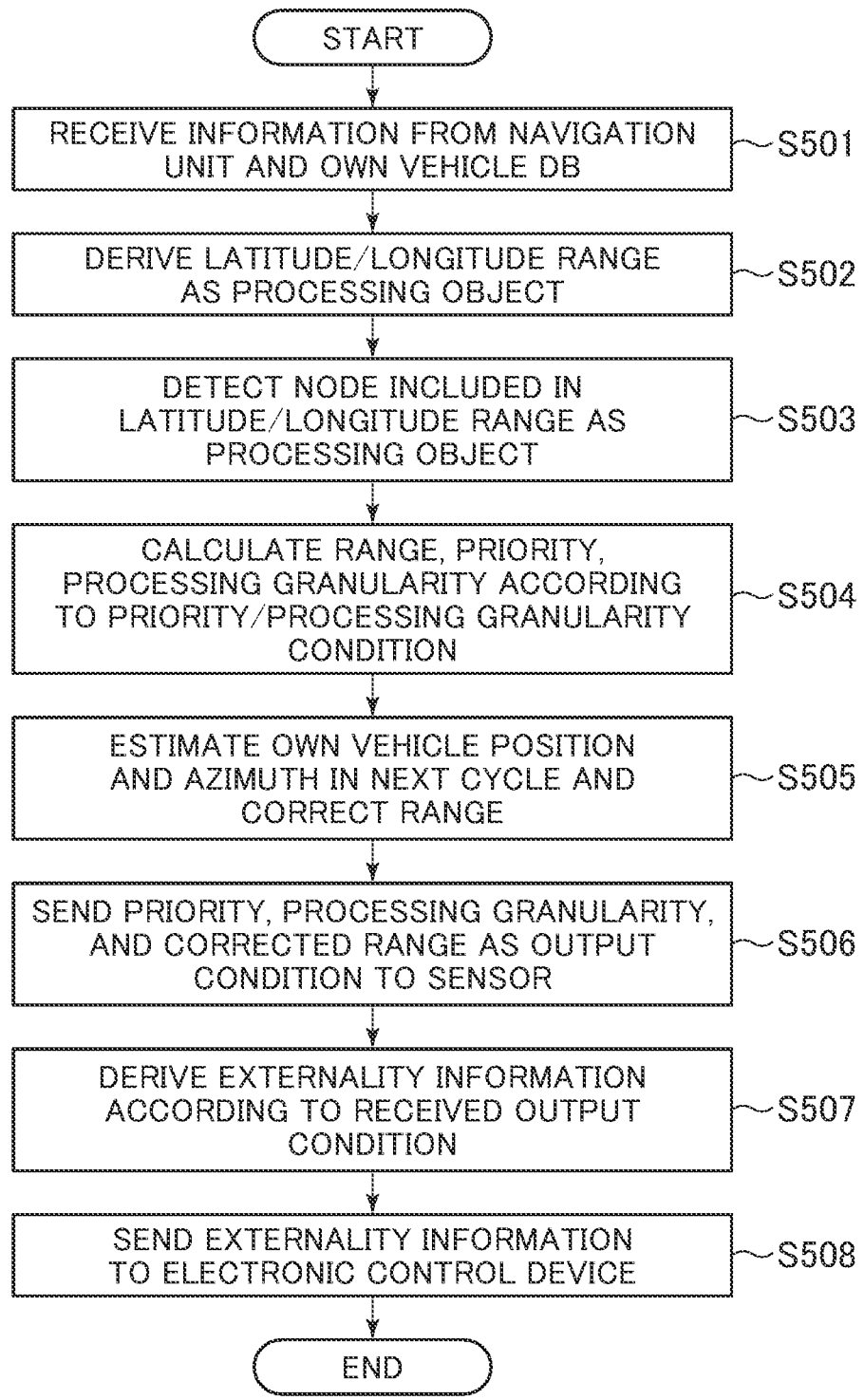
FIG. 13 is a flowchart which shows operation of the on-vehicle system according to the first embodiment.

FIG. 13 is a flowchart which shows operation of the on-vehicle system S1. The on-vehicle system S1 performs the process shown in FIG. 13 in a given cycle, for example, 100 ms cycle. At Step S101, the condition calculation unit 311 acquires the terrain 323, route 324, the latitude, longitude, and azimuth of the own vehicle from the navigation unit 2 and acquires the speed, yaw rate, and steering angle of the own vehicle from the own vehicle DB.

At Step S102, the condition calculation unit 311 derives the range of latitude and longitude to be the processing object, on the basis of the latitude, longitude, and azimuth of the own vehicle as received at Step S101 and a preset sensing range. The sensing range is preset in the device storage unit 32, for example, as a rectangle which extends 100 m backward, 300 m forward, 200 m leftward and 200 m rightward from the own vehicle. At Step S102, for example, the latitudes and longitudes of the four points as the apexes of the rectangular area to be the processing object are calculated.

At Step S103, the condition calculation unit 311 detects the nodes included in the latitude/longitude range as the processing object as calculated at Step S102, among the nodes included in the terrain 323 received at Step S101. For example, if the terrain 323 is expressed as shown in FIG. 6, a node in which a representative point of a lane covered by each node, for example, the latitude and longitude of the first listed lane, is included in the latitude/longitude range derived at Step S102 as the processing object is detected.

At Step S104, the condition calculation unit 311 calculates the processing condition 322 using the condition creation source 321. For example, if the condition creation source 321, terrain 323, and route 324 are expressed as shown in FIG. 3, FIG. 6, and FIG. 7 respectively, the condition calculation unit 311 operates as follows. Namely, the condition calculation unit 311 search for a node which meets a condition among the conditions included in the condition creation source 321 in the order from top, calculates the range in accordance with the range derivation equation set in the same line, and records it as an area 3223 in the processing condition 322. Furthermore, it records the priority 3213 and processing granularity 3214 set in the same line in the processing condition 322, as priority 3221 and processing granularity 3222.

For example, if the condition set in the first line of the condition creation source in FIG. 3 is "in route & intersection", a node with "intersection" as the attribute in the terrain 323 in FIG. 6 is searched from among the nodes included in the route 324 in FIG. 7 and "N12" is extracted. Then, in the same manner, the range is derived in accordance with the range derivation equation "f1 (La, Lo, θ) to derive the latitude range la1 to La2 and longitude range Lo3 to Lo4.

Then, in the same manner, "1" as priority and "1 point/1 m" as processing granularity which are set in the first line of the condition creation source 321 in FIG. 3 are written in the processing condition 322. At this time, processing granularity may be converted so as to be expressed by a relative magnification ratio (2) with respect to prescribed processing granularity (½ m). By carrying out the same process for each of the second and subsequent lines of the condition creation source 321 in FIG. 3, priority 3221 and processing granularity 3222 can be determined as shown in FIG. 4 for all the lines of the condition creation source 321 in FIG. 3.

At Step S105, the condition calculation unit 311 estimates the position and azimuth of the own vehicle in the next cycle on the basis of the information received from the own vehicle DB 6 at Step S101 and shifts and rotates the range calculated at Step S104 for correction. For example, if it receives the latitude/longitude, azimuth, speed and yaw rate of the own vehicle and the corresponding time from the own vehicle DB 6, it calculates the amount of change in the position and azimuth of the own vehicle at the time of the next cycle in the case that the own vehicle runs at the same speed and the same yaw rate until the time of the next cycle. Then, it determines the following rectangle as a range corrected by shift/rotation: a rectangle including the range obtained by converting the range calculated at Step S104, for example, the latitude range La1 to La2 and longitude range Lo3 to Lo4, into an own vehicle-centered coordinate system with the own vehicle position and azimuth in the next cycle, for example, the coordinate range X11 to Xul in the traveling direction and the coordinate range Yll to Yul in the left-right direction.

At Step S106, the condition calculation unit 311 creates the processing condition 322 by combining the priority 3221 and processing granularity 3222 calculated at Step S104 and the range corrected by shift/rotation at Step S105, and sends it to the processing object determination unit 111.

At Step S107, the processing object determination unit 111 of the externality recognition sensor 1 derives the externality information 122 according to the processing condition 322 sent at Step S106. For example, if the processing condition is expressed as shown in FIG. 4, it searches the first line in which the highest priority "1" is set. As a result of searching, if a plurality of lines with the same priority are found, processing is performed in accordance with the rule preset in the sensor storage unit 12, for example, a rule that processing should be performed in the ascending order from the lowest line number. Then, according to the range and processing granularity set in the line extracted as a result of searching, the externality information 122 (X, Y) detected in the range is identified by the specified processing granularity. At this time, if the externality recognition sensor 1 has the function to set probability for each landmark position, probability may be set for each landmark position as shown in FIG. 8.

The function to set probability is, for example, the function to set probability according to the landmark edge position error which depends on the degree of landmark blurring or the surrounding illuminance. Processing as mentioned above may be also performed in accordance with the rule preset in the sensor storage unit 12. The rule is, for example, that processing should be repeated until the number of landmark positions reaches the upper limit number 64 or that if the upper limit number is exceeded during processing for a certain range, processing should be performed in order from the landmark position near the own vehicle until the upper limit number is reached.

At Step S108, the externality information output unit 112 sends the externality information 122 derived at Step S107 to the vehicle control unit 312. The received landmark position information is stored as externality information 325, for example, in the device storage unit 32. The externality information 325 may be discarded after vehicle control processing by the vehicle control unit 312.

According to the above first embodiment, the following effects are produced.

(1) The on-vehicle system S1 is mounted in a vehicle and provided with an electronic control device 3 and an externality recognition sensor 1. The externality recognition sensor 1 includes a sensing unit 13 for acquiring pre-processing externality information 123 through sensing operation. The on-vehicle system S1 includes: a condition calculation unit 311 that, on the basis of the vehicle position, vehicle traveling direction, and map information, calculates a processing condition 322 in which information identifying an area on the map is associated with the processing priority of the pre-processing externality information 123 acquired by the externality recognition sensor; and a processing object determination unit 111 that, on the basis of the pre-processing externality information 123 and the processing condition 121, creates externality information 122 having a smaller amount of information than the pre-processing externality information 123. Therefore, even in an environment with a lot of externality information such as an intersection, information on feature points of an area with high priority, namely externality information 122 smaller in the amount of information than the pre-processing externality information 123 is created and thus even when the electronic control device 3 does not have a high computing capacity, it can perform required processing.

(2) The processing condition 121 is the priority 3221 and processing granularity 3222 as spatial density of output which are associated with the area 3223 on the map. Therefore, information is obtained not only according to area selection by priority, but also according to processing granularity set for each area.

(3) The externality information 122 is information concerning landmarks, and processing of pre-processing externality information 123 is the process to derive the feature points of a landmark. Therefore, landmark information which depends on the processing condition 322 can be obtained as externality information 122.

(4) A landmark is a lane mark present on a road and the processing granularity 3222 is point density in derivation of feature points of the lane mark. Therefore, when the processing granularity 3222 is higher, a larger number of feature points can be derived from one detected lane mark per unit length.

(5) The condition calculation unit 311 identifies the vehicle traveling direction on the basis of the position of the vehicle and the route 324 which is a previously calculated traveling route of the vehicle. Therefore, it is possible to acquire adequate area information with high density according to the traveling route of the vehicle. In addition, if an area in which the vehicle will not travel is previously known, for example, if the vehicle is going to take a left turn at the intersection, it is possible that the externality information 122 does not include information on the area on the right-turn side and the area for the vehicle to run straight.

(6) The electronic control device 3 includes a condition calculation unit 311 and a condition transmission unit 33 for transmitting the processing condition 322 to the externality recognition sensor 1. The externality recognition sensor 1 includes a sensing unit 13 and a processing object determination unit 111.

(7) The externality recognition sensor 1 is mounted in a vehicle and provided with: a sensing unit 13 that acquires pre-processing externality information through sensing operation; a condition reception unit 14 that acquires the processing condition 121 which is created on the basis of the vehicle position, vehicle traveling direction, and map information, and in which information identifying an area on the map is associated with the processing priority of the pre-processing externality information acquired by the externality recognition sensor; and a processing object determination unit 111 that creates externality information 122 having a smaller amount of information than the pre-processing externality information 123, on the basis of the pre-processing externality information 123 and processing condition 121. Therefore, even in an environment with a lot of externality information such as an intersection, the externality recognition sensor 1 creates information on feature points of an area with high priority, namely externality information 122 smaller in the amount of information than the pre-processing externality information 123, on the basis of the calculated processing condition 322. Consequently, even when the electronic control device 3 does not have a high computing capacity, it can deal with an intersection with a lot of information.

(Variation 1)

The device storage unit 32 of the electronic control device 3 may store a plurality of condition creation sources 321 so that the condition calculation unit 311 decides which condition creation source 321 to be used, on the basis of the information indicating the country/region where the own vehicle is travelling, which is acquired from the navigation unit 2. For example, the condition calculation unit 311 may calculate the processing condition 322, using the condition creation source 321 which differs according to whether the country or region has a traffic rule that a vehicle should run on the right side in the traveling direction or a traffic rule that a vehicle should run on the left side in the traveling direction.

(Variation 2)

In the above first embodiment, the externality recognition sensor 1 outputs information on the feature points of a landmark which is a stationary object, as externality information 122. However, instead the externality recognition sensor 1 may detect a moving object, such as another vehicle, a pedestrian or bicycle and output the information.

(Variation 3)

In the above first embodiment, the processing condition 322 includes processing granularity 3222. However, the processing condition 322 need not include processing granularity 3222. Even if that is the case, the externality information 122 includes not the landmark information on all the areas around the own vehicle but the landmark information only on the object area, so the same effects as in the first embodiment can be produced.

Second Embodiment

Next, the on-vehicle system according to the second embodiment will be described referring to FIG. 14. In the explanation below, the same elements as in the first embodiment are designated by the same reference signs and different points are mainly described. Points that are not described below are the same as in the first embodiment. This embodiment is mainly different from the first embodiment in that the processing condition 322 is changed according to the externality information 325 in the past. This makes it possible to collect more information that is important for control of the vehicle, without an increase in the total volume of processing, so higher safety can be ensured with the same volume of processing.

The hardware configuration and functional configuration of the on-vehicle system are the same as in the first embodiment. In the second embodiment, processing by the on-vehicle system is increased as follows. Specifically, Step S511, which is explained below, is added between Step S504 and Step S505.

Figure 14:
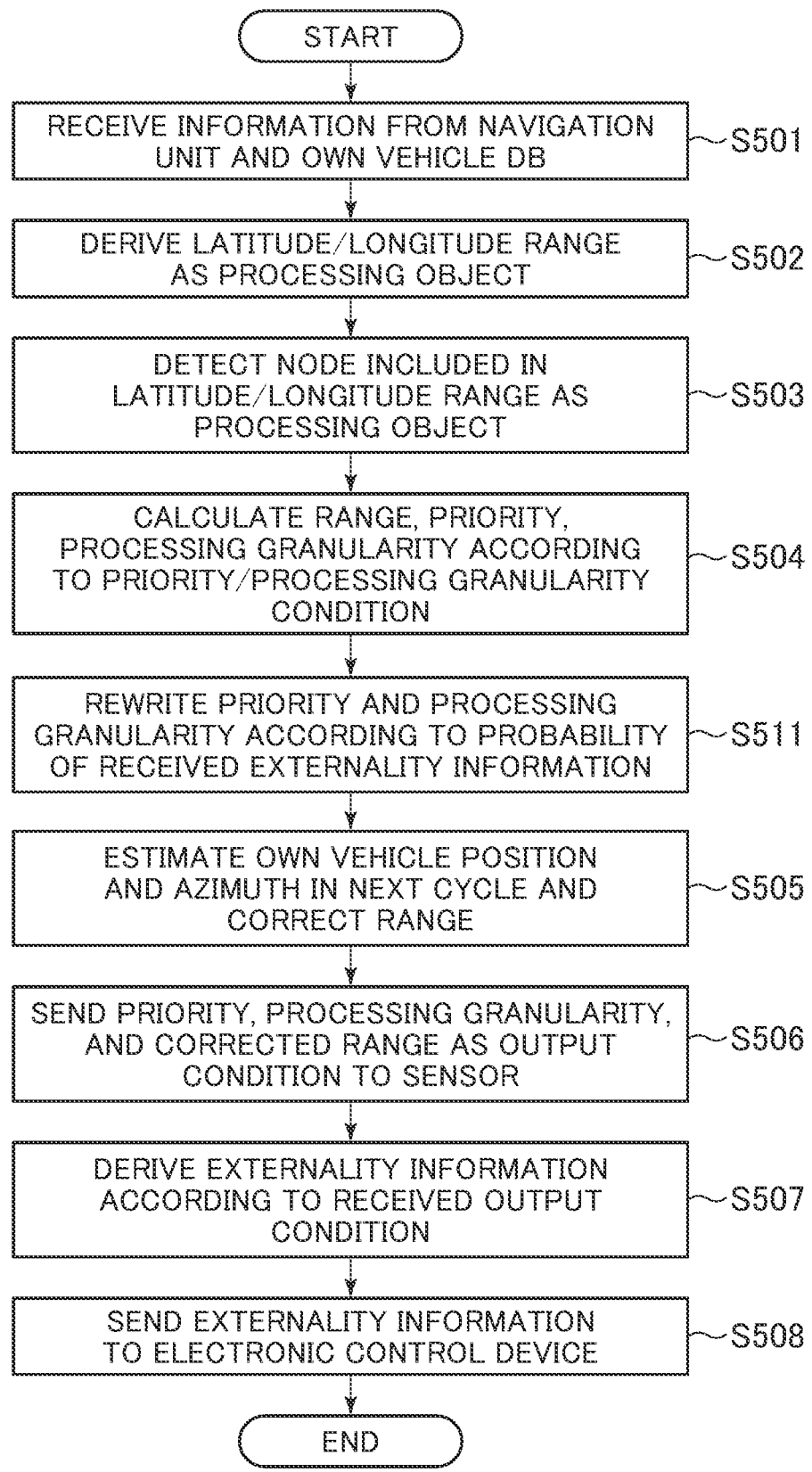
FIG. 14 is a flowchart which shows operation of the on-vehicle system according to the second embodiment.

FIG. 14 is a flowchart which shows processing in the on-vehicle system according to the second embodiment. Explanations of the same steps as in the first embodiment are omitted. At Step S511 to be carried out next to Step S504, the condition calculation unit 311 rewrites at least one of the priority and processing granularity calculated at Step S104 according to the probability in the externality information 325 received from the externality information output unit 112.

For example, the condition calculation unit 311 may lower the processing granularity for an area on which information with high probability has already been acquired, to decrease the number of output points for the area or lower its priority to make the output more difficult. Specifically, for example, the pieces of externality information 325 acquired just before are rearranged in the ascending order of X coordinate values and a range which has higher probability than a prescribed threshold, for example, 80 and is continuous is identified and the priority of the range is changed to "3" and the processing granularity is changed to "1 point/5 m".

According to the above second embodiment, the following effects are produced.

(8) The externality information 122 includes probability 1223 that indicates the degree of correctness. The condition calculation unit 311 corrects the processing condition according to probability 1223. Therefore, the condition calculation unit 311 can correct the processing condition 322 according to the information on the surroundings which has been acquired in the past.

(9) If the probability for an area in the acquired externality information 325 is a prescribed value or more, the condition calculation unit 311 lowers the priority for the area in the processing condition 322. Therefore, more information which is important for control of the vehicle can be collected without an increase in the total volume of processing, so higher safety can be ensured with the same volume of processing.

Third Embodiment

Next, the on-vehicle system according to the third embodiment will be described referring to FIG. 15. In the explanation below, the same elements as in the first embodiment are designated by the same reference signs and different points are mainly described. Points that are not described below are the same as in the first embodiment. This embodiment is mainly different from the first embodiment in that the processing condition 322 is adjusted according to vehicle steering action. This makes it possible to collect more information which is important for control of the vehicle, without an increase in the total volume of processing, even if the user moves the vehicle in a direction different from the prescribed route, so an effect that higher safety can be ensured with the same volume of processing is expected.

Figure 15:
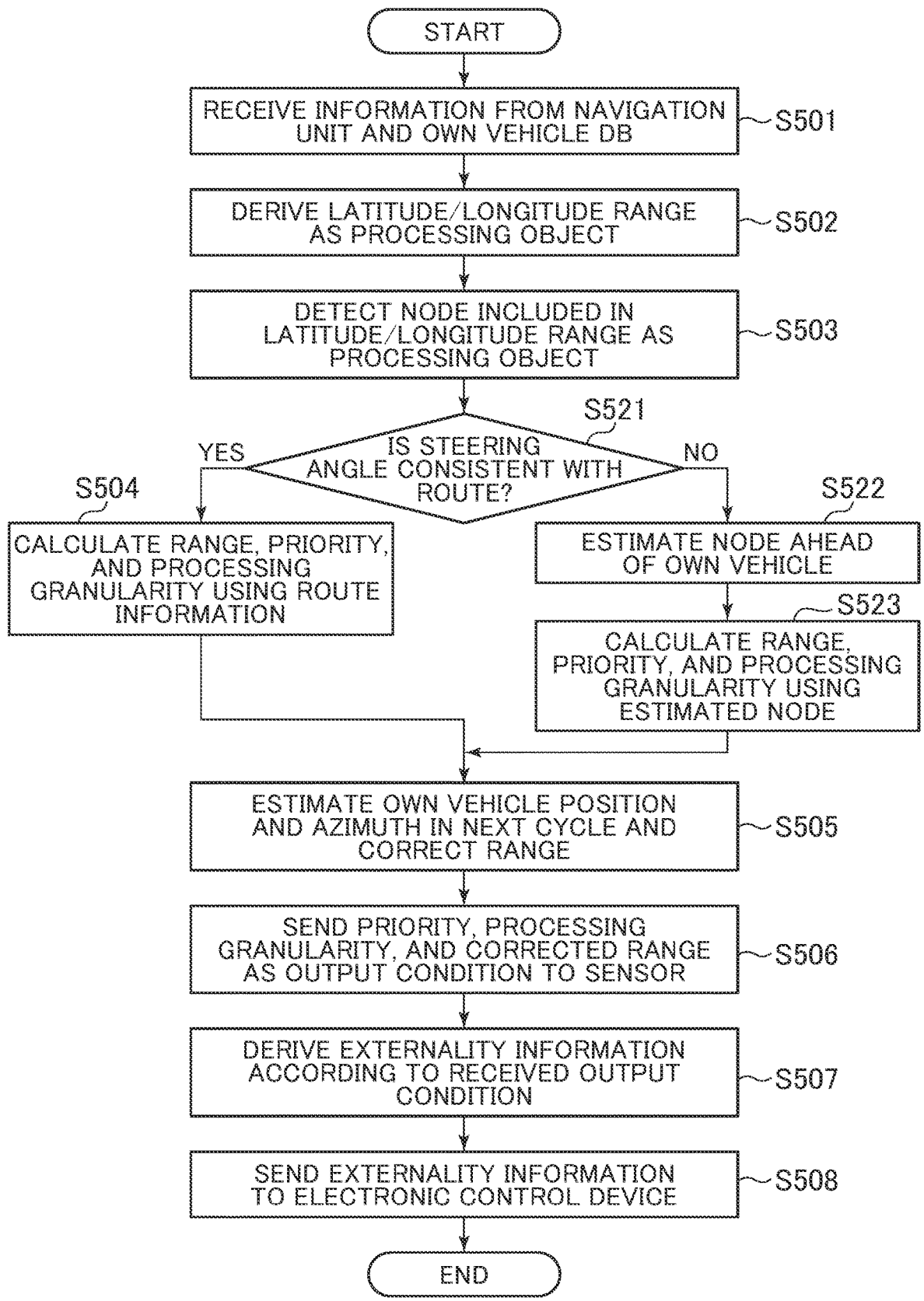
FIG. 15 is a flowchart which shows operation of the on-vehicle system according to the third embodiment.

FIG. 15 is a flowchart which shows processing in the on-vehicle system according to the third embodiment. The steps up to Step S503 are the same as in the first embodiment and their explanations are omitted. Next to Step S503, the condition calculation unit 311 decides whether the steering angle is consistent with the route or not. For example, if the steering angle is consistent with the route, it decides whether at the time to take a left turn, the steering angle is consistent with the angle to turn left or not. If the condition calculation unit 311 decides that the steering angle is consistent with the route, it goes to Step S504 or if it decides that the steering angle is not consistent with the route, it goes to Step S522.

At Step S504, as in the first embodiment, it calculates the range, priority, and processing granularity using the route information and goes to Step S505. At Step S522, the condition calculation unit 311 estimates a node ahead of the own vehicle. At the next step S523, the condition calculation unit 311 calculates the range, priority, and processing granularity using the node estimated at Step S522 and goes to Step S505. Step S505 and subsequent steps are the same as in the first embodiment and their explanations are omitted.

According to the third embodiment, the following effect is produced.

(10) The condition calculation unit 311 identifies the traveling direction of the vehicle on the basis of the position of the vehicle, the previously calculated traveling route of the vehicle or the steering angle of the vehicle. Therefore, it can deal with a case that the vehicle runs out of the route 324.

Fourth Embodiment

Next, the on-vehicle system according to the fourth embodiment will be described referring to FIG. 16. In the explanation below, the same elements as in the first embodiment are designated by the same reference signs and different points are mainly described. Points that are not described below are the same as in the first embodiment. This embodiment is mainly different from the first embodiment in that the electronic control device includes a processing object determination unit.

Figure 16:
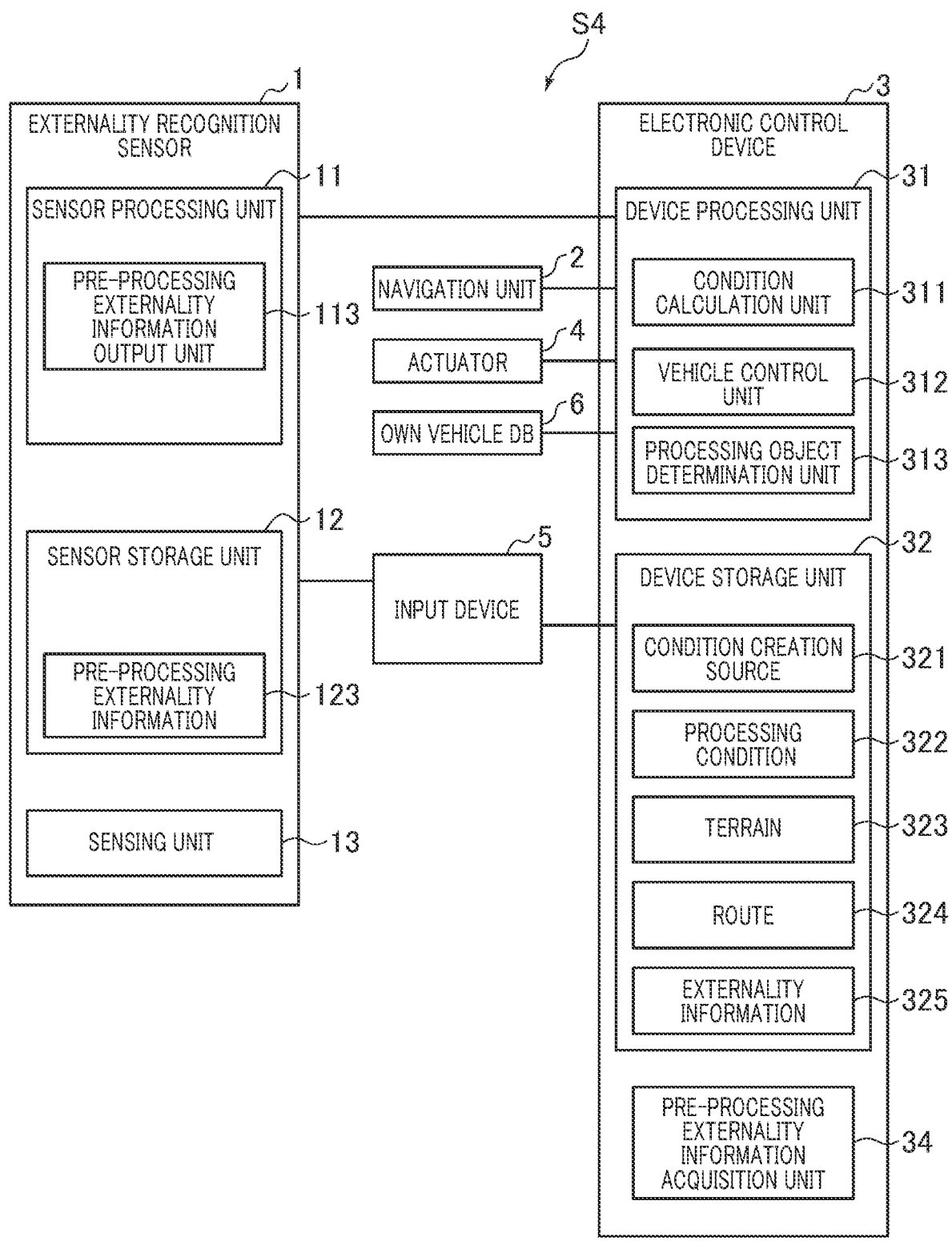
FIG. 16 is a general configuration diagram of the on-vehicle system according to the fourth embodiment.

FIG. 16 is a general configuration diagram of the on-vehicle system S4 according to the fourth embodiment. All the elements of the on-vehicle system S4 are included in the on-vehicle system S1 according to the first embodiment. However, the locations of specific functions are different. Specifically, whereas in the first embodiment the processing object determination unit 111 is located in the externality recognition sensor 1, in this embodiment it is located as a processing object determination unit 313 in the electronic control device 3. The processing object determination unit 313 operates in the same way as the processing object determination unit 111 in the first embodiment.

In this embodiment, the electronic control device 3 need not send the calculated processing condition 322 to the externality recognition sensor 1, so it need not include the condition transmission unit 33. The externality recognition sensor 1 does not include the processing object determination unit 111, externality information output unit 112, and condition reception unit 14. However, the externality recognition sensor 1 includes a pre-processing externality information output unit 113 that sends the acquired pre-processing externality information 123 to the electronic control device 3.

According to the above fourth embodiment, the following effects are produced.

(11) The electronic control device 3 includes a condition calculation unit 311 and a processing object determination unit 313. The externality recognition sensor 1 includes a pre-processing externality information output unit 113 that sends the pre-processing externality information 123 to the electronic control device 3. Therefore, the vehicle control unit 312 of the electronic control device 3 takes only the externality information 325 calculated by the processing object determination unit 313 using the processing condition 322, as the processing object, so that it can deal with an intersection with a lot of information.

(12) The electronic control device 3 is mounted in a vehicle and connected to the externality recognition sensor 1 that acquires the pre-processing externality information 123 through sensing operation. The electronic control device 3 includes: a condition calculation unit 311 that, on the basis of the vehicle position, vehicle traveling direction, and map information, calculates a processing condition 322 in which information identifying an area on the map is associated with the processing priority of the pre-processing externality information 123 acquired by the externality recognition sensor 1; a pre-processing externality information acquisition unit 34 that acquires the pre-processing externality information 123 from the externality recognition sensor 1; and a processing object determination unit 313 that, on the basis of the pre-processing externality information 123 and the processing condition 322, creates externality information 325 having a smaller amount of information than the pre-processing externality information 123.

In the abovementioned embodiments and variations, the functional block configurations are just examples. Some of the functional blocks separately shown in the figures may be integrated or one functional block shown in the figures may be divided into two or more functional blocks. Furthermore, some of the functions in a functional block may be transferred to another functional block.

The abovementioned embodiments and variations may be combined. Various embodiments and variations have been described above but the present is not limited thereto. Other embodiments that are within the scope of the technical idea of the present invention are also included in the scope of the present invention.

The disclosure of the following priority basic application is incorporated herein as a citation.

Japanese Patent Application 2019-90541 (filed on May 13, 2019).

LIST OF REFERENCE SIGNS

1 . . . externality recognition sensor,
3 . . . electronic control device,
13 . . . sensing unit,
14 . . . condition reception unit,
33 . . . condition transmission unit,
34 . . . pre-processing externality information acquisition unit,
111 . . . processing object determination unit,
112 . . . externality information output unit,
113 . . . pre-processing externality information output unit,
121, 322 . . . processing condition,
122, 325 . . . externality information,
123 . . . pre-processing externality information,
311 . . . condition calculation unit,
313 . . . processing object determination unit,
321 . . . condition creation source,
323 . . . terrain,
324 . . . route

The invention claimed is:

1. An on-vehicle system to be mounted in a vehicle and provided with an electronic control device and an externality recognition sensor,
the externality recognition sensor comprising a sensing unit for acquiring pre-processing externality information through sensing operation,
the system comprising:
a condition calculation unit that, on the basis of a position of the vehicle, traveling direction of the vehicle, and map information, calculates a processing condition in which information identifying an area on the map is associated with processing priority of the pre-processing externality information acquired by the externality recognition sensor; and
a processing object determination unit that, on the basis of the pre-processing externality information and the processing condition, creates externality information having a smaller amount of information than the pre-processing externality information,
wherein the externality information includes probability indicating a degree of correctness, and
the condition calculation unit corrects the processing condition according to the probability.

2. The on-vehicle system according to claim 1, wherein the processing condition associates the priority and processing granularity as spatial density of output with the area on the map.

3. The on-vehicle system according to claim 2, wherein the externality information is information concerning a landmark, and
processing of the pre-processing externality information is a process to derive feature points of the landmark.

4. The on-vehicle system according to claim 3, wherein the landmark is a lane mark present on a road and the processing granularity is point density in derivation of the feature points of the lane mark.

5. The on-vehicle system according to claim 1, wherein when the probability of a first area in the acquired externality information is a prescribed value or more, the condition calculation unit lowers the priority of the first area in the processing condition.

6. The on-vehicle system according to claim 1, wherein the condition calculation unit identifies the traveling direction of the vehicle on the basis of the position of the vehicle and the previously calculated traveling route of the vehicle or a steering angle of the vehicle.

7. The on-vehicle system according to claim 1,
the electronic control device comprising:
the condition calculation unit; and
a condition transmission unit that sends the processing condition to the externality recognition sensor, wherein
the externality recognition sensor comprises the sensing unit and the processing object determination unit.

8. The on-vehicle system according to claim 1, wherein the electronic control device comprises the condition calculation unit and the processing object determination unit, and
the externality recognition sensor comprises a pre-processing externality information output unit that sends the pre-processing externality information to the electronic control device.

9. An externality recognition sensor to be mounted in a vehicle, comprising:
a sensing unit that acquires pre-processing externality information through sensing operation;

a reception unit that acquires a processing condition which is created on the basis of a position of the vehicle, traveling direction of the vehicle, and map information and in which information identifying an area on the map is associated with processing priority of the pre-processing externality information acquired by the externality recognition sensor; and a processing object determination unit that, on the basis of the pre-processing externality information and the processing condition, creates externality information having a smaller amount of information than the pre-processing externality information, wherein the externality information includes probability indicating a degree of correctness, and the condition calculation unit corrects the processing condition according to the probability.

10. An electronic control device to be mounted in a vehicle and connected to an externality recognition sensor that acquires pre-processing externality information through sensing operation, the electronic control device comprising:

a condition calculation unit that, on the basis of a position of the vehicle, traveling direction of the vehicle, and map information, calculates a processing condition in which information identifying an area on the map is associated with processing priority of the pre-processing externality information acquired by the externality recognition sensor;

a pre-processing externality information acquisition unit that acquires the pre-processing externality information from the externality recognition sensor; and a processing object determination unit that, on the basis of the pre-processing externality information and the processing condition, creates externality information having a smaller amount of information than the pre-processing externality information, wherein the externality information includes probability indicating a degree of correctness, and the condition calculation unit corrects the processing condition according to the probability.

* * * * *